(12) United States Patent
Jerdee et al.

(10) Patent No.: US 6,291,048 B1
(45) Date of Patent: Sep. 18, 2001

(54) POLYMERIC BASED CARPET

(75) Inventors: Gary D. Jerdee; Brad D. Rodgers, both of Orange; Eugene D. Medlock, Bridge City; Roger Kolm, The Woodlands, all of TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/252,599

(22) Filed: Feb. 16, 1999

(51) Int. Cl.⁷ .............................. B32B 7/12; B32B 27/08
(52) U.S. Cl. ................... 428/97; 428/95; 428/96; 428/354
(58) Field of Search ................ 428/95, 97, 354, 428/520, 96

(56) References Cited

U.S. PATENT DOCUMENTS

| | | | |
|---|---|---|---|
| 3,390,035 | * | 6/1968 | Sands . |
| 3,583,936 | * | 6/1971 | Stahl . |
| 3,982,051 | * | 9/1976 | Taft et al. . |
| 4,443,575 | * | 4/1984 | Iwai et al. . |
| 4,939,036 | * | 7/1990 | Reith . |
| 5,023,143 | * | 6/1991 | Nelson ................... 428/516 |
| 5,240,530 | * | 8/1993 | Fink . |
| 5,300,580 | * | 4/1994 | Wild et al. . |
| 5,445,860 | * | 8/1995 | Bova . |
| 5,500,472 | * | 3/1996 | Liedermooy et al. . |
| 5,534,575 | * | 7/1996 | Foster et al. . |
| 5,624,986 | * | 4/1997 | Bunnelle et al. . |
| 5,763,330 | * | 6/1998 | Bertolucci et al. . |
| 5,928,782 | * | 7/1999 | Albrecht . |
| 5,958,563 | * | 9/1999 | Harwood et al. ............ 428/212 |
| 5,962,129 | * | 10/1999 | Halloran et al. . |
| 6,007,892 | * | 12/1999 | Harwood et al. .............. 428/95 |

* cited by examiner

Primary Examiner—Cheryl Juska
(74) Attorney, Agent, or Firm—Jonathan Wood; Harry Gwinnell

(57) ABSTRACT

Polymeric carpet and a method of making and recycling such carpet, the carpet having fibers, backing and extruded adhesive all of completely recyclable materials, the recycling being accomplished in one melting step, without a separation step.

9 Claims, No Drawings

POLYMERIC BASED CARPET

FIELD OF THE INVENTION

The present invention relates to a polymeric based carpet.

BACKGROUND OF THE INVENTION

It is desired in the textile industry to create products that are 100 percent recyclable with minimum difficulty. Today's commercially provided carpet products are predominantly manufactured using a latex based binder to adhere the backing scrim to the carpet fibers. The purpose of the scrim and latex are to bind the carpet fibers and prevent the fibers from becoming unwoven or loose. The latex is undesirable from a recycling point of view. In order to reclaim the carpet fibers and scrim, which are normally polypropylene, polyester, or polyamide based, the latex has to be separated from the total composite.

A method of making and recycling carpet of all recyclable material has been disclosed. The disclosed carpet includes a primary backing having tufts of synthetic carpet fibers protruding from a top surface and, optionally, a secondary backing, with an extruded sheet of an isotactic polyolefin polymer between and integrally fused to a bottom surface of the primary backing and an upper surface of the secondary backing. The isotactic polyolefin polymers shown to be effective to fuse the carpet fibers and the secondary backing in the disclosure are isotactic polypropylene and extruded blends of polypropylene with polyethylene, polybutylene and thermoplastic elastomers. The previous disclosures teach that polyethylene copolymers alone are a poor choice for such a fusion material. Furthermore, it has been disclosed that if anything other than polypropylene is used for the face fiber, extruded sheet and secondary back, that the bonding of the materials must be physically separated before recycling can take place.

In contrast, in the present invention, the use of ethylene methyl acrylate copolymers as such a fusion material replacement for latex conventionally used to bind carpet fibers to backing material not only eliminates the need for a separation recovery process but also enhances the total products' performance when recycled. Furthermore, such a copolymer has advantages over polypropylene and the various polypropylene blends previously disclosed.

SUMMARY OF THE INVENTION

The present invention relates to a carpet composition, recyclable without a separation step, having from 50 to 100 percent polymeric material comprising:

a) a tufted primary backing having a primary backing and tufts of carpet fibers penetrating a bottom surface of the primary backing and protruding from a top surface of the primary backing;

b) a secondary backing material; and c) an extruded adhesive material or a coextrusion of two or more extruded adhesive materials binding an upper surface of the secondary backing material to the bottom surface of the primary backing;

in which the carpet fibers, primary backing material and secondary backing material are selected from the group consisting of polypropylene, polyester, acrylics, polyethylene, polyamide, nylon, wool, cotton, rayon and combinations thereof;

and in which the adhesive material comprises an amorphous polyethylene copolymer selected from the group consisting of ethylene methyl acrylate, ethylene normal butyl acrylate, and blends of two or more polyethylene copolymers.

In a preferred embodiment, the extruded adhesive material of the above described carpet composition comprises a middle layer of polyethylene sandwiched between two outer layers selected from the group consisting of ethylene methyl acrylate and ethylene normal butyl acrylate.

In a more preferred embodiment, the middle polyethylene layer of the above described extruded adhesive material is from 10 to 90 weight percent of the extruded adhesive material and each of the two outer layers is from 5 to 45 weight percent of the extruded adhesive material.

In another preferred embodiment, the adhesive material of the above described carpet composition further comprises maleic anhydride.

In yet another preferred embodiment, the adhesive material of the above described carpet composition is a coextruded blend of ethylene methyl acrylate copolymers and polymers selected from the group consisting of low density polyethylenes, linear low density polyethylenes, high density polyethylenes, ultra low density polyethylene having a density less than 0.915 density, ethylene-propylene copolymers, elastomers, rubber, EPDM (ethylene propylene diene monomer) rubber, styrenic copolymers of butadiene, styrenic copolymers of acrylonitrile, styrenic copolymers of ethylene, metallocene based polyethylenes, polypropylene, polyester, ethylene acrylic acid copolymers, ethylene methyl acrylic acid copolymers, butyl acrylate copolymers, ethylene vinyl acetate copolymers, ionomers, polyamides, and maleic anhydrides.

In still another preferred embodiment, the adhesive material of the above described carpet composition has a thickness of from 0.001 inches to 0.050 inches.

In yet another preferred embodiment, the adhesive material of the above described carpet composition further comprises additives selected from the group consisting of flame retardants, odor reduction additives, scent enhancing additives and ultra-violet light protection additives.

In still another preferred embodiment, the adhesive material of the above described carpet composition further comprises fillers selected from the group consisting of talc, calcium carbonate and other inorganic fillers.

The present invention also relates to a method of making a carpet, the carpet comprising a tufted primary backing with a primary backing and tufts of carpet fibers penetrating a bottom surface of the primary backing and protruding from a top surface of the primary backing; a secondary backing material; and an adhesive material binding an upper surface of the secondary backing material to the bottom surface of the tufted primary backing; the carpet fibers, primary backing material and secondary backing material being selected from the group consisting of polypropylene, polyester, acrylics, polyethylene, polyamide, nylon, wool, cotton, rayon and combinations thereof and the adhesive material comprising an amorphous polyethylene copolymer selected from the group consisting of ethylene methyl acrylate and ethylene normal butyl acrylate; the method comprising the steps of:

a) extruding a heated sheet of the adhesive material; and b) continuously fusing together in a two roll nip the upper surface of the secondary backing and the bottom surface of the tufted primary backing with the heated sheet.

In a preferred embodiment of the above described method, the two roll nip comprises a hard roll and a soft roll.

In a more preferred embodiment of the above described method, the soft roll has a diameter of from 4 to 20 inches and a hardness of from 5 to 100 shore D.

In another more preferred embodiment of the above described method, the soft roll is comprised of rubber.

In still another more preferred method, the hard roll is a cooled metal chill roll capable of maintaining a temperature below 120° F.

In yet another more preferred method, the two roll nip has pressure between 20 and 200 pounds per linear inch.

The present invention also relates to a method of using at least one of ethylene methyl acrylate copolymer and ethylene normal butyl acrylate copolymer to manufacture a carpet, the carpet comprising a tufted primary backing with a primary backing and tufts of carpet fibers penetrating a bottom surface of the primary backing and protruding from a top surface of the primary backing; a secondary backing material; and an adhesive material binding an upper surface of the secondary backing material to the bottom surface of the tufted primary backing; the carpet fibers, primary backing material and secondary backing material being selected from the group consisting of polypropylene, polyester, acrylics, polyethylene, polyamide, nylon, wool, cotton, rayon and combinations thereof and the adhesive material comprising an amorphous polyethylene copolymer selected from the group consisting of ethylene methyl acrylate and ethylene normal butyl acrylate; the method comprising the steps of:

a) extruding a heated sheet of the adhesive material; and
b) continuously fusing together in a two roll nip the upper surface of the secondary backing and the bottom surface of the tufted primary backing with the heated sheet.

In a preferred embodiment of the above described method, the two roll nip comprises a hard roll and a soft roll.

In a more preferred embodiment of the above described method, the soft roll has a diameter of from 4 to 20 inches and a hardness of from 5 to 100 shore D.

In another more preferred embodiment of the above described method, the soft roll is comprised of rubber.

In still another more preferred embodiment of the above described method, the hard roll is a cooled metal chill roll capable of maintaining a temperature below 120° F.

In yet another more preferred embodiment of the above described method, the two roll nip has pressure between 20 and 200 pounds per linear inch.

The present invention also relates to a method of recycling a carpet, the carpet comprising a tufted primary backing with a primary backing and tufts of carpet fibers penetrating a bottom surface of the primary backing and protruding from a top surface of the primary backing; a secondary backing material; and an extruded adhesive material or a coextruded blend of two or more extruded adhesive materials binding an upper surface of the secondary backing material to the bottom surface of the primary backing; the carpet fibers, primary backing material and secondary backing material being selected from the group consisting of polypropylene, polyester, acrylics, polyethylene, polyamide, nylon, wool, cotton, rayon and combinations thereof and the adhesive material comprising an amorphous polyethylene copolymer selected from the group consisting of ethylene methyl acrylate and ethylene normal butyl acrylate; the method comprising the step of melting the carpet to obtain an extrudate feedstock.

DETAILED DESCRIPTION OF THE INVENTION

A novel composite and process has been invented which creates a 50 to 100 percent polymeric product which allows it to be recycled. The composite can provide water-resistant properties heretofore impossible with latex bound carpet products. In addition, the new product can incorporate performance-enhancing additives such as flame-retardants, odor reduction additives, scent-enhancing additives, ultraviolet light protection additives and inorganic materials, such as talc and calcium carbonate, for cost reduction and strength properties. It has also been found that when calcium carbonate is added as a filler, it functions as a "heat sink", i.e., it lets the polymer blend stay hot longer during the manufacturing process. This has the effect of improving the penetration of the polymer into the carpet fibers.

With the use of ethylene methyl acrylate based copolymers, the carpet can now be ground and reprocessed with no interim step to remove incompatible materials. When incorporated with polypropylene, polyester and polyamide polymers, methyl acrylate copolymers act as a compatibilizer to cause the new blend to adhere to itself in any subsequent fabrication process.

The use of ethylene methyl acrylate copolymers as a replacement for latex conventionally used to bind carpet fibers to backing material not only eliminates the need for a separation recovery process but also enhances the total products' performance when recycled. The ethylene methyl acrylate material serves as a binder for the reclaimed product as well as improving the impact resistance and pliability of the secondary produced product.

In addition to the novel materials used in the new composite, certain processing techniques are employed that guarantee the proper level of adhesion is obtained in the laminate. These techniques a rubber nip roll with a diameter of 4 to 20 inches, and a hardness of 50 to 100 shore D. A water-cooled metal chill roll capable of maintaining a temperature below 120° F. The pressure of the rubber to steel nip is between 40 and 200 pounds per linear inch. Extrudate temperatures greater than 550° F. is preferred.

EXAMPLES

The invention will be further illustrated by the following examples, which set forth particularly advantageous method embodiments. While the Examples are provided to illustrate the present invention, they are not intended to limit it.

Example 1

Various samples of carpet were manufactured having tufts of polypropylene interwoven in a primary backing of polypropylene with an extruded sheet of ethylene methyl acrylate copolymer sandwiched to the bottom of the primary backing and the top of a secondary backing of polypropylene. The carpets were made in two different weave styles and at various extrudate speeds and temperatures. The Fiber Lock and Tuft Bind tests were applied to the samples and were scored with Pass (P), Marginal (M) or Fail (F) scores. The results are shown in Table 1.

TABLE 1

| Style | Temperature | Speed | Fiber Lock Score |
|---|---|---|---|
| Seacroft | 575 | 100 | Marginal |
| Seacroft | 575 | 75 | Pass |
| Seacroft | 575 | 50 | Pass |
| Seacroft | 600 | 75 | Pass |
| Glasgow | 575 | 100 | Pass |
| Glasgow | 575 | 75 | Pass |
| Glasgow | 575 | 50 | Pass |
| Glasgow | 600 | 75 | Pass |

Example 2

Various samples of carpet were manufactured having tufts of polypropylene interwoven in a primary backing of polyamide with an extruded sheet of ethylene methyl acrylate copolymer sandwiched to the bottom of the primary backing and the top of a secondary backing of polyamide. The carpets were made in different weave styles and at various extrudate thicknesses and temperatures. The Fiber Lock and Tuft Bind tests were applied to the samples and were scored with Pass (P), Marginal (M), or Fail (F) scores. The results are shown in Table 2.

TABLE 2

| Style | Extrudate Temp. | Extrudate Thickness | Fiber Lock Score | Tuft Bind Score (lb.) |
|---|---|---|---|---|
| Sample 1 | 575 | 5.0 mils | Fail | 6.0 |
| Sample 1 | 575 | 7.5 mils | Fail | 8.0 |
| Sample 1 | 575 | 10 mils | Pass | 8.5 |
| Sample 1 | 600 | 7.5 mils | Marginal | 8.0 |
| Heavier wt. Level loop - Polyamide | | | | |
| Sample 2 | 575 | 5.0 mils | Marginal | 9.0 |
| Sample 2 | 575 | 7.5 mils | Pass | 8.5 |
| Sample 2 | 575 | 10 mils | Pass | 8.0 |
| Sample 2 | 600 | 7.5 mils | Marginal | 10.5 |
| Sample 3 | 575 | 5.0 mils | Pass | 8.0 |
| Sample 3 | 575 | 7.5 mils | Pass | 12.0 |
| Sample 3 | 575 | 10 mils | Pass (much better) | 10.0 |
| Sample 3 | 600 | 7.5 mils | Pass | N/A |
| Textured Level loop - Polyamide | | | | |
| Sample 4 | 575 | 5.0 mils | Marginal | 10.0 |
| Sample 4 | 575 | 7.5 mils | Pass | 12.0 |
| Sample 4 | 575 | 10 mils | Pass | 10.0 |
| Sample 4 | 600 | 7.5 mils | Pass | 10.0 |
| Polyamide | | | | |
| Sample 5 | 575 | 5.0 mils | Fail | 10.0 |
| Sample 5 | 575 | 7.5 mils | Fail | 10.0 |
| Sample 5 | 575 | 10 mils | Marginal | 8.0 |
| Sample 5 | 600 | 7.5 mils | Marginal | 8.0 |
| 26 oz. P.A. Level loop- Polyamide | | | | |
| Sample 6 | 575 | 5.0 mils | Fail | 9.5 |
| Sample 6 | 575 | 7.5 mils | Marginal | 10.0 |
| Sample 6 | 575 | 10 mils | Pass | 6.0 |
| Sample 6 | 600 | 7.5 mils | Marginal | 8.0 |
| Polyamide | | | | |
| Sample 7 | 575 | 5.0 mils | Marginal | 8.5 |
| Sample 7 | 575 | 7.5 mils | Pass | 10.5 |
| Sample 7 | 575 | 10 mils | Pass | 12.0 |
| Sample 7 | 600 | 7.5 mils | Pass | 12.0 |
| Level loop - Polyamide | | | | |
| Sample 8 | 575 | 5.0 mils | Pass | N/A |
| Sample 8 | 575 | 7.5 mils | Pass | N/A |
| Sample 8 | 575 | 10 mils | Pass | N/A |
| Sample 8 | 600 | 7.5 mils | Pass | N/A |
| Cut pile - Polyamide | | | | |

While the present invention has been described with reference to specific embodiments, this application is intended to cover those various changes and those skilled in the art may make those substitutions without departing from the spirit and scope of the appended claims.

What is claimed is:

1. A carpet composition, recyclable without a separation step, having from 50 to 100 percent polymeric material comprising:

a) a tufted primary backing having a primary backing and tufts of carpet fibers penetrating a bottom surface of the primary backing and protruding from a top surface of the primary backing;

b) a secondary backing material; and c) an adhesive material binding an upper surface of the secondary backing material to the bottom surface of the primary backing;
   wherein the adhesive material comprises a middle layer of polyethylene sandwiched between two outer layers selected from the group consisting of ethylene methyl acrylate and ethylene normal butyl acrylate.

2. The carpet composition of claim 1 wherein the middle polyethylene layer of the extruded adhesive material is from 10 to 90 weight percent of the extruded adhesive material and each of the two outer layers is from 5 to 45 weight percent of the extruded adhesive material.

3. The carpet composition of claim 1 wherein the adhesive material further comprises maleic anhydride.

4. The carpet composition of claim 1 wherein the adhesive material has a thickness of from 0.001 inches to 0.050 inches.

5. The carpet composition of claim 1 wherein the adhesive material further comprises additives selected from the group consisting of flame retardants, odor reduction additives, scent enhancing additives and ultra-violet light protection additives.

6. The carpet composition of claim 1 wherein the adhesive material further comprises fillers selected from the group consisting of talc, calcium carbonate and other inorganic fillers.

7. The carpet composition of claim 1 wherein said primary backing material is selected from the group consisting of polypropylene, polyester, acrylics, polyethylene, polyamide, wool, cotton, rayon and combinations thereof.

8. The carpet composition of claim 1 wherein said carpet fibers are selected from the group consisting of polypropylene, polyester, acrylics, polyethylene, polyamide, wool, cotton, rayon and combinations thereof.

9. The carpet composition of claim 1 wherein said secondary backing material is selected from the group consisting of polypropylene, polyester, acrylics, polyethylene, polyamide, wool, cotton, rayon and combinations thereof.

* * * * *